(12) United States Patent
Hsu

(10) Patent No.: US 8,612,154 B2
(45) Date of Patent: Dec. 17, 2013

(54) MEASUREMENT OF SOUND SPEED OF DOWNHOLE FLUID BY HELMHOLTZ RESONATOR

(75) Inventor: Chaur-Jian Hsu, Danbury, CT (US)

(73) Assignee: Schlumberger Technology Corporation, Sugar Land, TX (US)

(*) Notice: Subject to any disclaimer, the term of this patent is extended or adjusted under 35 U.S.C. 154(b) by 426 days.

(21) Appl. No.: 11/877,114

(22) Filed: Oct. 23, 2007

(65) Prior Publication Data

US 2009/0101432 A1   Apr. 23, 2009

(51) Int. Cl.
  *G01V 1/40* (2006.01)
(52) U.S. Cl.
  USPC ............................................... 702/11
(58) Field of Classification Search
  USPC ............... 702/11, 9; 367/33, 13; 340/854.3; 166/255.1; 73/64.53, 24.06; 175/327
  See application file for complete search history.

(56) References Cited

U.S. PATENT DOCUMENTS

| | | | |
|---|---|---|---|
| 3,105,460 A | 10/1963 | Bouyoucos | |
| 4,383,308 A | 5/1983 | Caldwell | |
| 4,628,725 A | 12/1986 | Gouilloud | |
| 4,700,100 A | 10/1987 | Congdon et al. | |
| 4,780,858 A | 10/1988 | Clerke | |
| 4,890,687 A | 1/1990 | Medlin et al. | |
| 4,953,137 A | 8/1990 | Medlin | |
| 5,171,943 A | 12/1992 | Balogh et al. | |
| 5,210,718 A * | 5/1993 | Bjelland et al. | 367/13 |
| 5,359,324 A * | 10/1994 | Clark et al. | 340/854.3 |
| 5,831,934 A | 11/1998 | Gill | |
| 6,481,288 B1 | 11/2002 | Humphrey et al. | |
| 6,957,572 B1 | 10/2005 | Wu | |
| 7,397,388 B2 * | 7/2008 | Huang et al. | 340/853.3 |
| 7,398,672 B2 * | 7/2008 | Riddle | 73/24.06 |
| 2005/0126777 A1 * | 6/2005 | Rolovic et al. | 166/255.1 |
| 2006/0018190 A1 * | 1/2006 | Brooks | 367/33 |
| 2006/0120217 A1 | 6/2006 | Wu | |
| 2007/0022803 A1 * | 2/2007 | DiFoggio et al. | 73/64.53 |
| 2007/0215388 A1 * | 9/2007 | Kirk et al. | 175/327 |
| 2008/0262736 A1 * | 10/2008 | Thigpen et al. | 702/9 |

FOREIGN PATENT DOCUMENTS

| | | |
|---|---|---|
| JP | 63173988 A | 7/1988 |
| JP | 4042042 A | 2/1992 |
| JP | 09015020 A * | 1/1997 |

OTHER PUBLICATIONS

Batchelor, G.K., An Introduction to Fluid Dynamics, 1977, pp. 264-377, Chapter 5, Cambridge University Press.

(Continued)

*Primary Examiner* — Tung S Lau
*Assistant Examiner* — Xiuquin Sun
(74) *Attorney, Agent, or Firm* — Jakub Michna; Rachel E. Greene; Bridget Laffey

(57) ABSTRACT

A downhole logging tool is equipped with a modified Helmholtz resonator for facilitating acoustic formation evaluation and reservoir characterization. The resonator permits calculation of sound speed and viscosity of the fluid in the resonator cavity. The presence of gas bubbles in the fluid may also be detected. The modified Helmholtz resonator includes at least two openings so that fluid can flow through the resonator cavity. Because fluid can flow through the resonator cavity, local fluid can be measured under local conditions, e.g., downhole temperature, pressure, and gas influx from formations. Further, the modified Helmholtz resonator utilizes an acoustic signal at or near the frequency of interest for at least some acoustic logging tools.

29 Claims, 7 Drawing Sheets

(56) References Cited

OTHER PUBLICATIONS

Brie, A., et al., Quantitative Formation Permeability Evaluation from Stoneley Waves, SPE Reservoir Eval. & Eng., Apr. 2000, pp. 109-117, vol. 3, No. 2.

Lide, D.R., CRC Handbook of Chemistry and Physics, 2000, p. 14-40, 81st Edition, CRC Press.

Kinsler, et al., Fundamentals of Acoustics, 1982, pp. 225-228, 3rd edition, Chapter 10, Wiley & Sons.

French, A. P., Vibrations and waves, The MIT Introductory Physics Series, 1971, pp. 77-92, W.W. Norton & Company.

Office Action of Japanese Application Serial No. 2010-501292 dated Dec. 13, 2011.

* cited by examiner

WIRELINE

MEASUREMENT OF SOUND SPEED OF DOWNHOLE FLUID BY HELMHOLTZ RESONATOR

BACKGROUND OF THE INVENTION

1. Field of the Invention

The invention is generally related to analysis of subterranean formations, and more particularly to measurement of sound speed of a downhole fluid to facilitate acoustic logging operations for formation evaluation and reservoir characterization.

2. Background of the Invention

Wireline and logging-while-drilling (LWD) tools are used to measure physical, chemical, and structural characteristics of formations surrounding a borehole. For example, data gathered by logging tools can be used to interpret formation stratigraphy, lithology, and mineralogy. Generally, the logging tool emits an acoustic, electromagnetic or optical signal and measures the response. In the case of acoustic logging tools, changes in amplitude, phase and speed of the received acoustic energy can be utilized to characterize the formation. Early generation acoustic logging tools extract formation compressional and shear speed from head waves. Consequently, those logging tools do not require knowledge of mud speed. Newer generation acoustic logging tools utilize acoustical modal propagations, such as Stoneley, dipole and quadrupole modes. Sound speed (and its reciprocal, sound slowness) affects the characterization of these modes. In particular, the propagation characteristics of these modes depend on the formation speed, borehole mud speed, and other parameters. Consequently, in order to obtain accurate measurement of the formation speed, it is desirable to obtain an accurate indication of mud sound speed independently.

Techniques for measuring fluid sound speed are known. Outside the borehole environment a wide variety of sound speed measurement equipment is available. However, the results obtained by measuring mud sound speed by examining mud at the surface are relatively inaccurate because sound speed of borehole mud is a function of its constituents, temperature and pressure. Consequently, the speed can vary over depth and time, and would change during transport to the surface.

SUMMARY OF THE INVENTION

The present invention relates to an apparatus for facilitating analysis of subterranean formations can comprise of at least one wall defining a Helmholtz cavity of known volume and shape having at least two openings that permit flow of fluid through the cavity. Further, the apparatus can include an acoustic source operable to transmit an acoustic signal through the fluid in the cavity and an acoustic receiver operable to receive the acoustic signal transmitted through the fluid in the cavity.

In accordance with another embodiment of the invention, a method for facilitating analysis of subterranean formations can comprise of causing fluid to flow through a Helmholtz cavity of known volume and shape having at least two openings. Further, the method may include transmitting with an acoustic source, an acoustic signal through the fluid in the cavity, and receiving, with an acoustic receiver, the acoustic signal transmitted through the fluid in the cavity.

One advantage of the invention is that sound speed measurement of borehole fluid can be made in situ, with both wireline and logging-while-drilling tools. Measurement of borehole fluid in situ yields an indication of sound speed at the location of the measurement because the measured fluid is local. Further, measurement accuracy can be enhanced because the fluid is subject ambient conditions of the location, e.g., temperature, pressure and formation gas influx, at the time of measurement.

Another advantage of the invention is that measurements can be obtained at sonic frequencies. For example, measurements obtained with at least some embodiments of the invention can be made in the frequency range of interest for sonic logging, e.g., below 1 kHz to 10 kHz. As a result, error due to dispersion is reduced, and a more accurate calculation of mud speed at or near the frequency at which the acoustic logging tool obtains measurements is produced.

Some embodiments of the invention provide other advantages in addition to accurate measurement of fluid sound speed at a desirable frequency. In particular, it is possible to utilize some embodiments of the invention to measure the viscosity of the borehole mud from the resonance quality factor, and also to detect the existence of gas bubbles.

The present invention is directed to an apparatus for facilitating analysis of subterranean formations. The apparatus can include at least one wall defining a Helmholtz cavity of known volume and shape having at least two openings that permit flow of fluid through the Helmholtz cavity. Further, the apparatus can include an acoustic source operable to transmit an acoustic signal through the fluid in the Helmholtz cavity and an acoustic receiver operable to receive the acoustic signal transmitted through the fluid in the Helmholtz cavity.

According to one aspect of the invention, the acoustic signal can have a frequency less than 10 kHz. The apparatus may further include a control unit operable in response to the acoustic signal from the acoustic receiver to calculate and store in memory at least one characteristic of the fluid. Wherein, the characteristic can include sound speed, fluid viscosity or the presence of gas bubbles. Further, the fluid can be formation fluid and/or borehole mud.

According to one aspect of the invention, the apparatus may further include a pump which is operable to facilitate flow of the fluid through the Helmholtz cavity. The apparatus may further include an inflow scoop which can be operable to facilitate flow of the fluid through the Helmholtz cavity.

According to another embodiment of the invention, the invention can include a method for facilitating analysis of subterranean formations. The method includes causing fluid to flow through a Helmholtz cavity of known volume and shape having at least two openings and then transmitting, with an acoustic source, an acoustic signal through the fluid in the cavity. The method further includes receiving, with an acoustic receiver, the acoustic signal transmitted through the fluid in the cavity.

According to one aspect of the invention, the acoustic signal may have a frequency less than 10 kHz. The method may further include calculating and storing in memory at least one characteristic of the fluid in response to the acoustic signal from the acoustic receiver. Wherein, the characteristic can include sound speed, fluid viscosity or the presence of gas bubbles. Further, the fluid can be formation fluid and/or borehole mud.

According to one aspect of the invention, the method may further include the step of pumping fluid through the cavity. The method may further include the step of an inflow scoop which is operable to facilitate flow of the fluid through the cavity.

According to another embodiment of the invention, the invention can include a device for facilitating analysis of formations. The device can include at least one wall defining a Helmholtz cavity of known volume and shape having at least two openings that permit flow of fluid through the Helmholtz cavity. The device can further include an acoustic source operable to transmit an acoustic signal through the fluid in the Helmholtz cavity. Further, the device can include an acoustic receiver operable to receive the acoustic signal transmitted through the fluid in the Helmholtz cavity. Finally, the device can include the acoustic receiver to be communicatively connected to at least one control unit so as to facilitate analysis of the formations.

According to one aspect of the invention, the device can include the control unit to be responsive to the acoustic signal from the acoustic receiver and calculates and stores in memory at least one characteristic of the fluid. Further, the fluid can be borehole mud and/or formation fluid.

According to one aspect of the invention, the device can further comprise of one or more flow device to facilitate flow of the fluid through the Helmholtz cavity.

Further features and advantages of the invention will become more readily apparent from the following detailed description when taken in conjunction with the accompanying Drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

The present invention is directed to a apparatus for facilitating analysis of subterranean formations comprises: at least one wall defining a Helmholtz cavity of known volume and shape having at least two openings that permit flow of fluid through the cavity; an acoustic source operable to transmit an acoustic signal through the fluid in the cavity; and an acoustic receiver operable to receive the acoustic signal transmitted through the fluid in the cavity.

Figure 1:
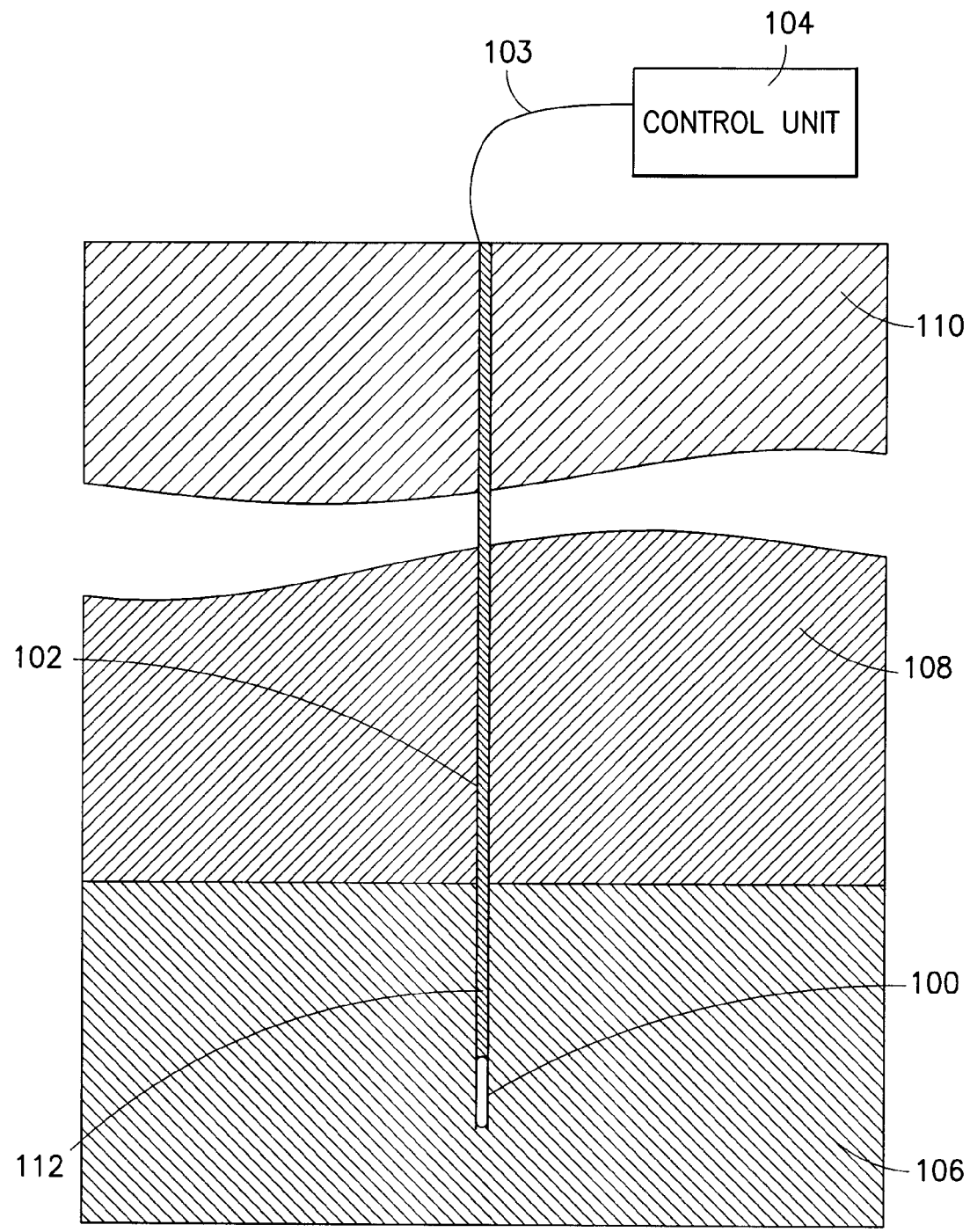
FIG. 1, illustrates an acoustic logging tool that utilizes a Helmholtz resonator to facilitate formation evaluation and reservoir characterization according to an aspect of the invention.

Referring to FIG. 1, a tool string (also referred as tool) (100) is utilized to measure physical, chemical, and structural characteristics of formations surrounding a borehole (102). The tool string, which may be part of a wireline logging tool string or logging-while-drilling tool string, is operable in response to a control unit (104) which may be disposed at the surface. The control unit (104) is also capable of data analysis with reference to a reservoir model maintained in a memory. The tool string (100) is connected to the control unit (104) (by a logging cable for a wireline tool, or by a drill pipe string for a LWD tool). The tool string (100) is lowered into the borehole to measure physical properties associated with the formation, which typically includes a reservoir (106) adjacent to an impermeable layer (108), and various other layers which make up the overburden (110). Data gathered by the tool may be communicated to the control unit in real time via the wireline cable or LWD telemetry.

The tool string (100) is equipped with a modified Helmholtz resonator for performing functions such as measuring the speed of sound in a fluid. For example, the modified Helmholtz resonator can be used to measure mud sound speed and formation fluid sound speed. Other uses include measuring fluid viscosity and detecting the presence of gas bubbles, among other things. To appreciate operation of the modified Helmholtz resonator, it is useful to review the principles of operation of a basic Helmholtz resonator.

Figure 2:
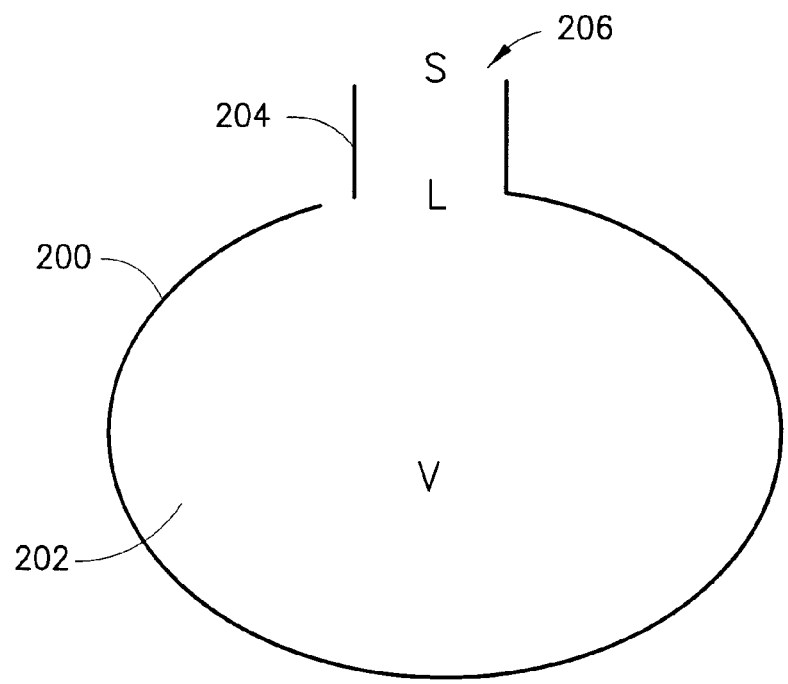
FIG. 2 illustrates a schematic representation of a basic Helmholtz resonator according to an aspect of the invention.

Referring to FIG. 2, a basic Helmholtz resonator includes rigid walls (200) which define a cavity (202) of known volume V, and a neck (204) of length L associated with a single opening (206) of area S. The basic resonator can be modeled as a spring-and-mass system, where the mass represents fluid moving in the neck (204) as a unit and the spring represents uniform compression and expansion of fluid inside the cavity (202). This lumped element representation is adequate because the resonance frequency is low, i.e., wavelength $\lambda$ in the fluidic medium is much greater (an order of magnitude or more) than L, $S^{1/2}$ and $V^{1/3}$. The derivation for the resonance frequency $\omega_o$ and sharpness $Q_R$ assuming inviscid fluid is as described below.

$$\omega_o = c \sqrt{\frac{S}{L'V}} \qquad \text{[Eq. 1]}$$

where $$L'=L+1.7a.$$

L' is the effective length of the neck (204), assuming the outer end is flanged, and "a" is the radius of the opening (206). With an unflanged outer end of the opening, the "added length" is 1.5a. The sound speed c of a fluid is related to the density $\rho$ and compressibility $\beta$ of the fluid as shown in Equation 2.

$$c=(1/\rho\beta)^{1/2} \qquad \text{[Eq. 2]}$$

It is evident from Equation 1 that for resonance frequency only parameter related to the fluid is its sound speed. The other parameters are defined by the geometry of the resonator. Further, the only relevant parameter of the cavity portion of the resonator is its volume. The exact shape of the cavity does not particularly matter because of the long wavelength condition.

The sharpness of the resonance depends on the energy dissipation. The acoustical radiation generated by the piston-like oscillatory motion of the fluid mass at the opening of the resonator results in the radiation-controlled quality factor $Q_R$.

$$Q_R = 2\pi \sqrt{V(L'/S)^3} \quad \text{[Eq. 3]}$$

$Q_R$ is independent of the fluidic medium, and depends only on the geometry of the resonator.

Equation 4 describes viscous dissipation at the neck due to the piston-like fluid motion relative to the neck wall. Assuming the viscous skin depth is much less than the radius of the opening, the viscosity-controlled quality factor $Q_v$ can be derived as:

$$Q_v = \frac{a}{\delta}\frac{L'}{L}, \quad \text{[Eq. 4]}$$

where $\delta$ is the viscous skin depth defined as $(2v/\omega)^{1/2}$, where $v$ and $\omega$ denote kinetic viscosity and angular frequency of the resonance, respectively.

The overall quality factor $Q_{(R+v)}$ counting both radiation and viscous dissipation is related to the two components described above as follows: $1/Q_{(R+v)} = 1/Q_R + 1/Q_v$. Because sound speed of a fluid such as borehole mud is a function of its constituents, temperature and pressure, an important consideration for measuring the speed of sound in at least some downhole fluids is that the fluid being sampled is local, i.e., obtained from a particular location, and still being subjected to the conditions of that location. However, it is also desirable to be able to utilize the resonator for multiple measurements on a given deployment. These constraints limit the usefulness of the basic Helmholtz resonator geometry because it would be difficult to repeatedly and reliably purge and refill the cavity (202) with local fluid.

Figure 3:
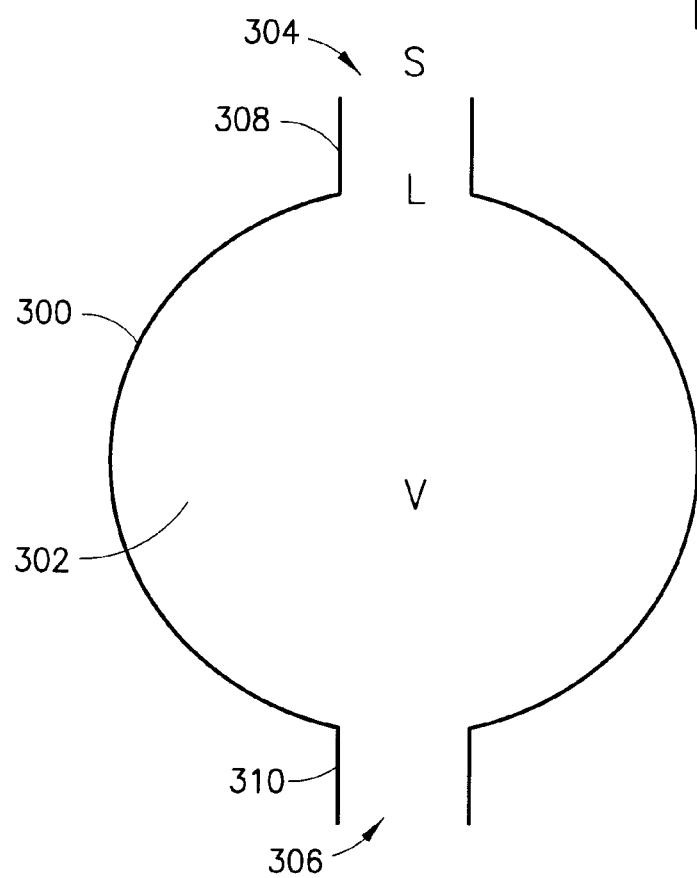
FIG. 3 illustrates a schematic representation of a modified Helmholtz resonator according to an aspect of the invention.

FIG. 3 is a schematic diagram of a modified Helmholtz resonator for measuring the sound speed of downhole fluid. The modified resonator includes walls (300) which define a cavity (302) of known volume V. Unlike the basic resonator (FIG. 2), the modified resonator includes at least two openings (a.k.a. ports) (304, 306) of area S (which need not be identical) to allow fluid to flow through the cavity (302) and thereby maintain the presence of local fluid in the cavity. Each opening (304, 306) is associated with a respective neck (308, 310) of known length L (which need not be identical). Each opening is capable of functioning as either an input or output for fluid. The openings may be disposed at different axial and azimuthal positions in order to accommodate tool design and movement, and facilitate the flow of fluid through the resonator cavity (302). In the illustrated example the two ports (304, 306) are similar and symmetrical, disposed on opposing sides of the cavity (302). Fluid in the two openings (304, 306) oscillate in phase, both moving inwards compressing the fluid in half of the oscillation cycle and moving outwards expanding the fluid in the other half of the oscillation cycle.

The symmetric two-port modified Helmholtz resonator can be represented as a spring with two identical masses, each attached on an opposing end of the spring. The resonance frequency of the illustrated resonator can be derived as in equation 5.

$$\omega_{o,2\,port} = c\sqrt{\frac{2S}{L'V}} \quad \text{[Eq. 5]}$$

where S and L' are the opening area and effective length of the neck. The resonance frequency $\omega_{o,2port}$ can be determined by transmitting an acoustic signal through the fluid in the cavity and measuring the signal at a receiver. In particular, the resonance frequency is the frequency of peak power transmission. Since area S and length L are known, the measured resonance frequency allows solution for sound speed c.

Certain comparisons between the one-port and two-port resonators are worth noting. The ratio of the resonance frequency of the two-port resonator to that of a one port resonator of otherwise identical dimensions is $\sqrt{2}$. The quality factor of a resonator is proportional to the ratio of the stored energy to the dissipated energy in each period. At each of the two ports, the ratio of radiation dissipation and viscous dissipation versus the kinetic energy of the moving fluid in the neck are the same as that of the one-port configuration. Thus, $Q_R$ and $Q_v$ of the two-port resonator are the same as that of the one-port configuration.

$$Q_{R,2\,port} = 2\pi\sqrt{V(L'/S)^3} \quad \text{[Eq. 6]}$$

$$Q_{v,2\,port} = \frac{a}{(2v/\omega)^{1/2}}\frac{L'}{L} \quad \text{[Eq. 7]}$$

Figure 4:
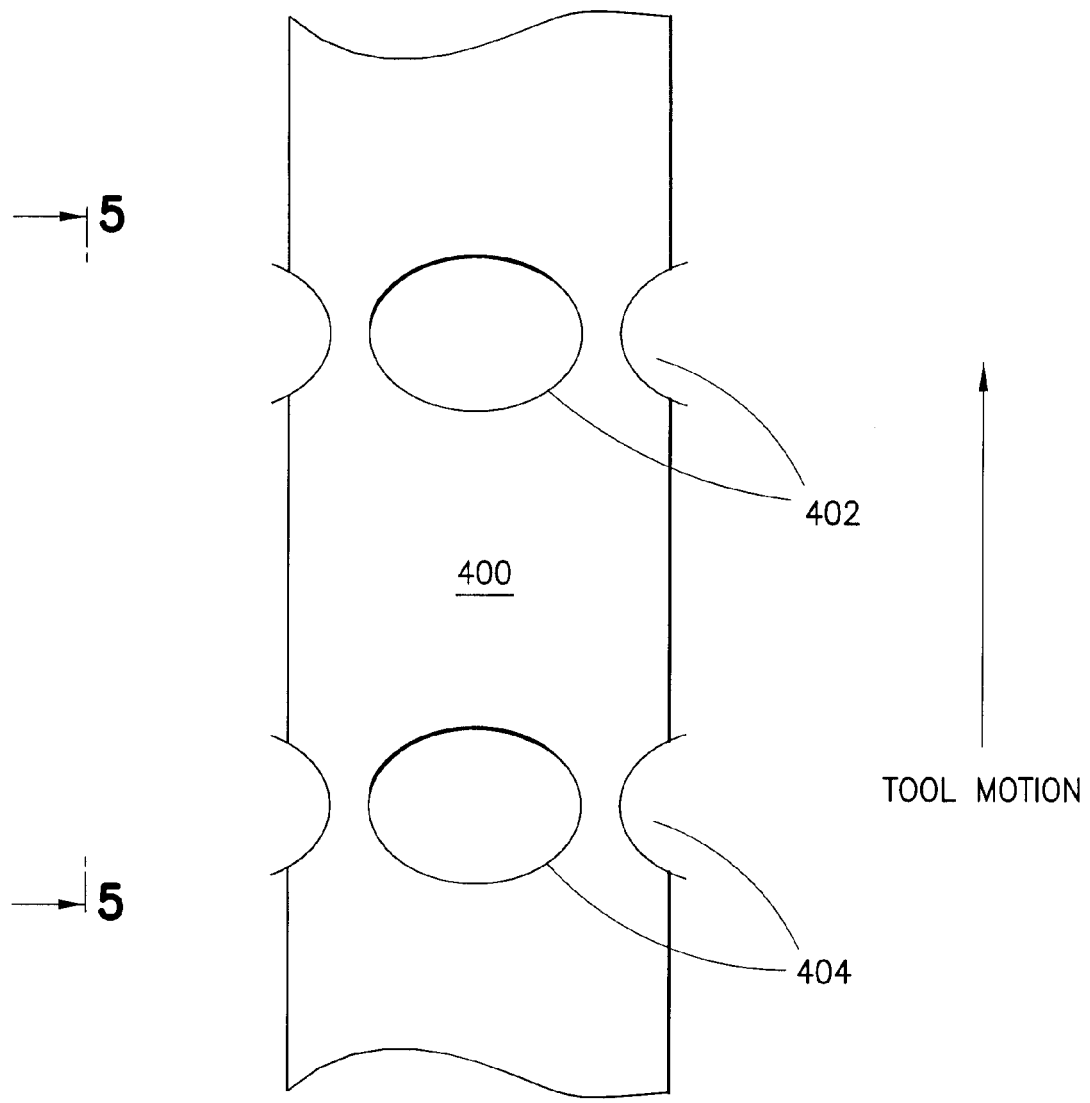
FIGS. 4 and 5 illustrate an embodiment of the acoustic logging tool adapted for wireline logging, including measuring mud sound speed with a modified Helmholtz resonator according to an aspect of the invention.
Figure 5:
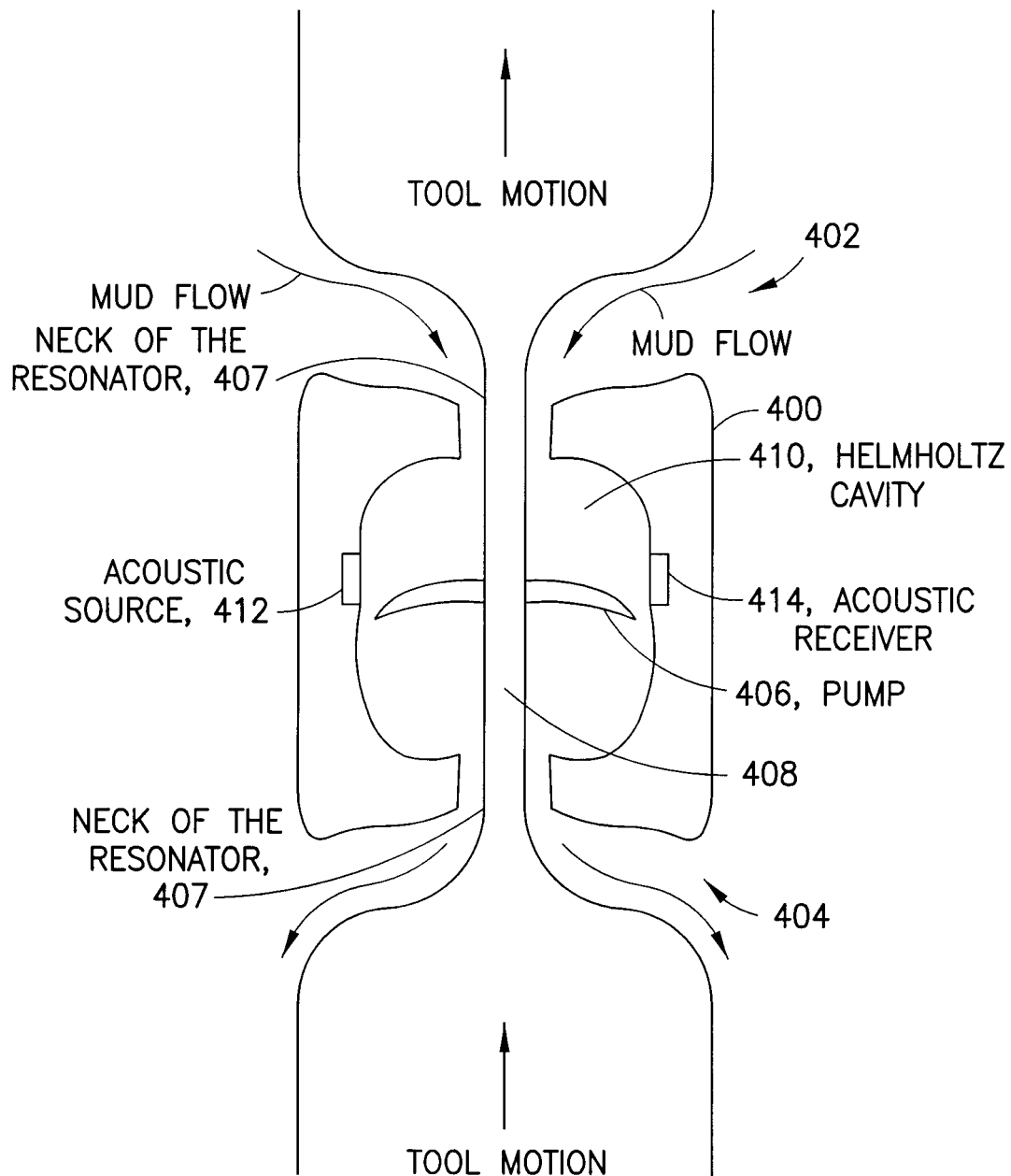

FIGS. 4 and 5 illustrate one embodiment of a modified Helmholtz resonator adapted for use in a wireline logging tool string. The resonator is shown in FIG. 5 as a lengthwise cross-section 5-5 of FIG. 4. Outer walls (400) define a cylindrical shape to facilitate insertion of the resonator into a borehole. A first opening (402) permits inflow of borehole mud and a second opening (404) permits outflow of borehole mud as induced by the tool movement in the direction as illustrated This tool motion induced flow is reversed as the tool moves in the opposite direction. Mud flow through the cavity can also be facilitated by a pump (406), or a combination of pump and motion. The resonator cavity (410) is defined by necks (407) proximate to the openings (402, 404). The device is not in a free field of fluid and the opening may not be a simple flanged or unflanged shape, and the effective length L' of the neck in Equation 5 can be calibrated with fluid of known sound speed. A mandrel (408) disposed through the resonator cavity (410) connects segments of the tool on opposite ends of the resonator. The mandrel enhances mechanical strength and may also be utilized as a conduit for electrical and optical cabling. Note that the illustrated embodiment has a single cavity (410), i.e., the mandrel does not isolate portions of the cavity or form multiple cavities. An acoustic source (412) and acoustic receiver (414) are disposed on the interior walls of the cavity. Note that the transducers may be disposed anywhere inside the cavity. The acoustic source (412) emits a signal sweeping over a range of frequencies. The Helmholtz resonance frequency is identified from the received acoustic signal, and subsequently the speed of sound of the fluid in the resonator is derived based on Equation 5 with known resonator geometry parameters. In particular, the receiver outputs a voltage, of which the amplitude and phase are used to calculate resonance frequency and quality factor Q. The resonance frequency $\omega_{o,2port}$ is the frequency of peak power, and the quality factor is the ratio of the resonance frequency and the bandwidth, which is defined by the half power frequency span. The phase angle of the received signal relative to the source signal goes through a 90 degree change across the half power frequency band, as typically observed in resonances. As will be described in greater detail below, borehole fluid viscosity may also be calculated.

Figure 6:
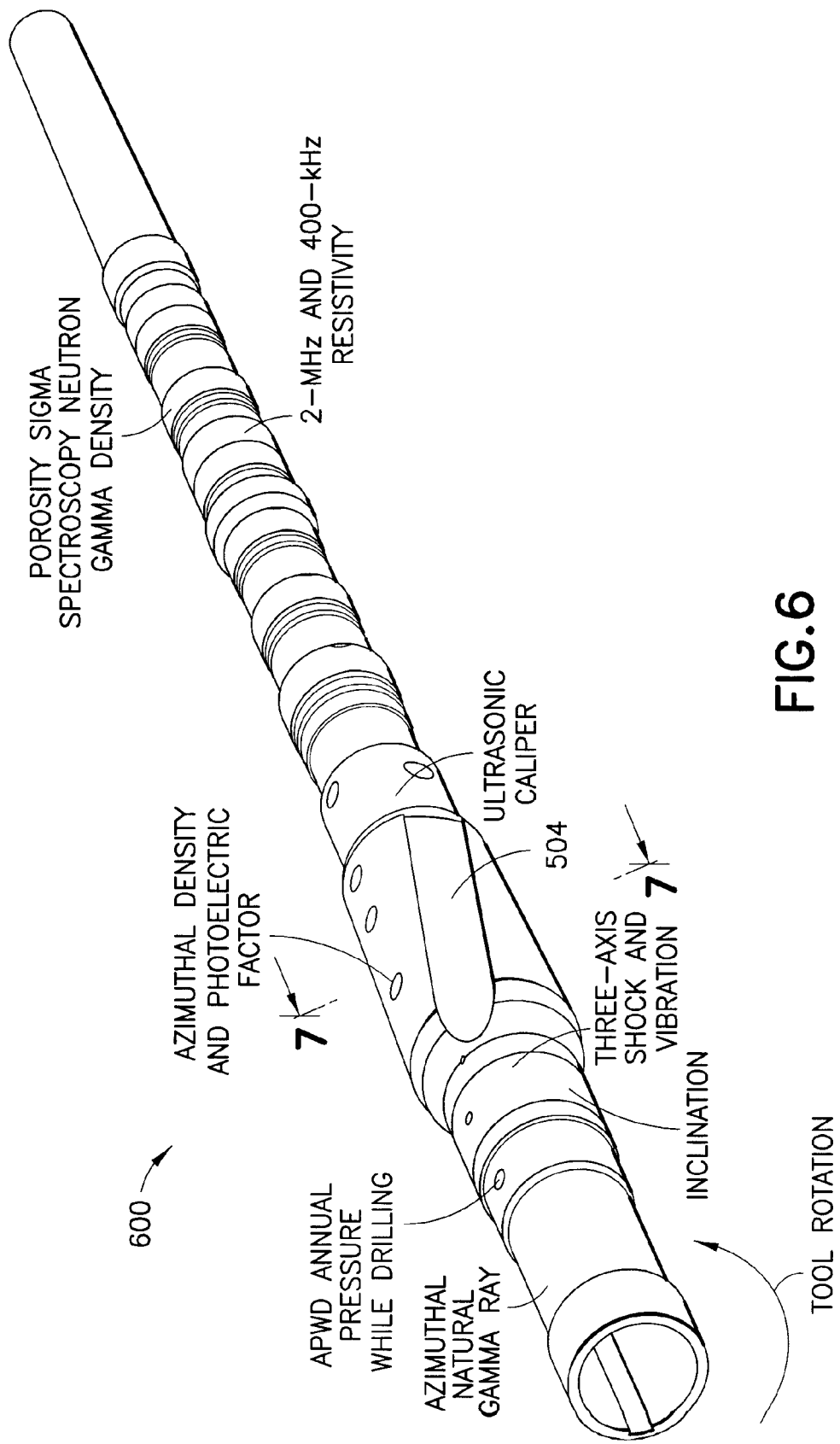
FIGS. 6 and 7 illustrate an embodiment of the acoustic logging tool adapted for logging-while-drilling, including measuring mud sound speed with a modified Helmholtz resonator according to an aspect of the invention.
Figure 7:
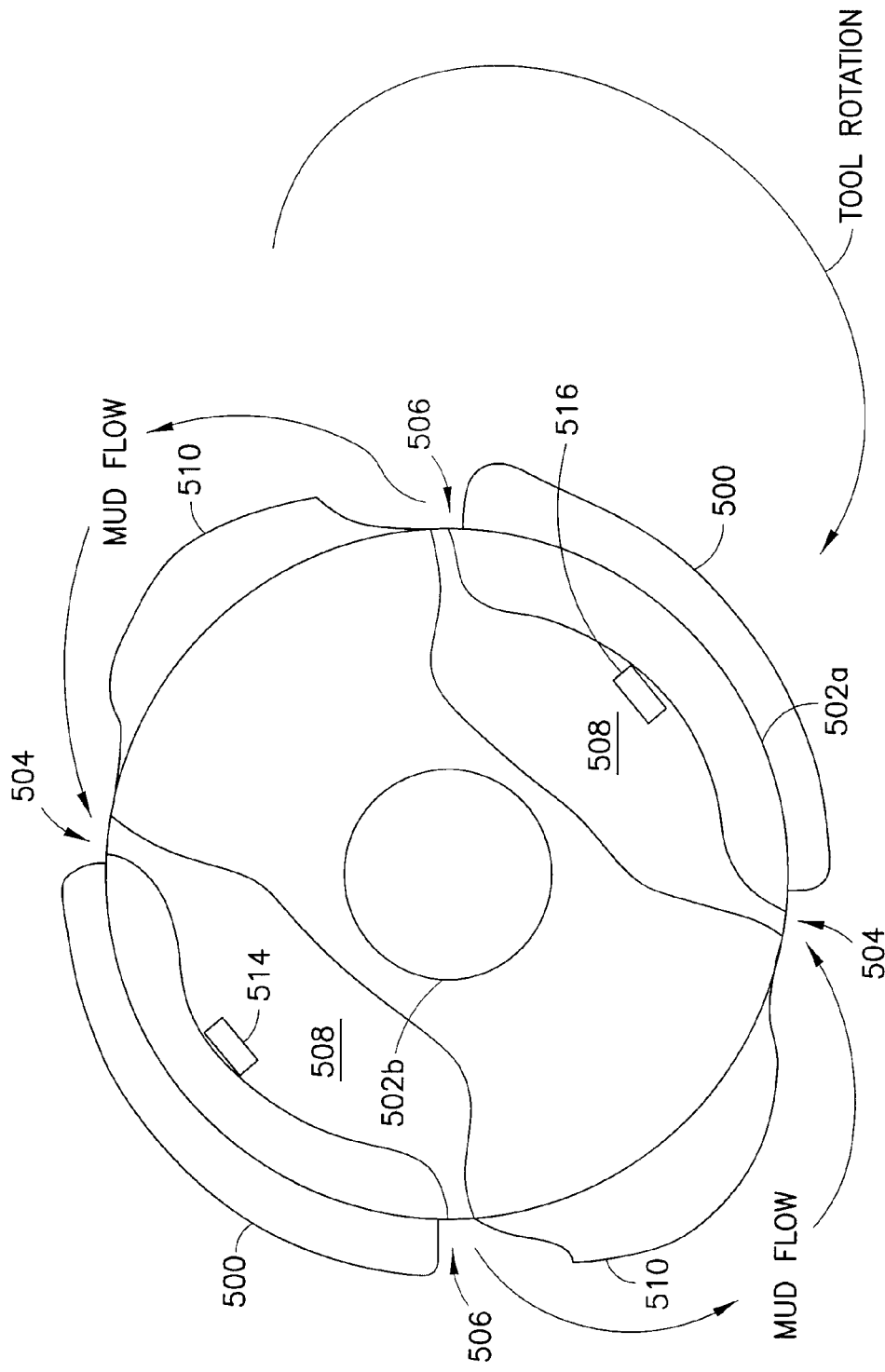

FIGS. 6 and 7 illustrate an embodiment of the modified Helmholtz resonator adapted for use in a LWD tool string (600). The cross section 7-7 marked on FIG. 6 is shown in FIG. 7. FIG. 7 depicts two resonators in one cross-section of FIG. 6. However, it should be noted that one resonator could provide a functional device, although two resonators can be used to provide a redundant measurement or a measurement at two a different frequencies. Referring to FIG. 7, two concentric circles (502a, 502b) represent the OD and ID of a drill collar. First and second openings (504) permit inflow of borehole mud, and third and fourth openings (506) permit outflow of borehole mud, as the tool is rotating clockwise. Note that the openings (504, 506) are not necessarily at the same axial position. Mud flow through the cavity (508) can be induced by the rotational motion of the tool in the borehole. In particular, one or more flow devices such as stabilizer fins (500) and scoops (510) can be used to encourage fluid to flow through the resonator cavity. An acoustic source (514) and acoustic receiver (516) are disposed on the interior walls of each cavity. The acoustic source emits a signal sweeping over a range of frequencies, the Helmholtz resonance frequency is identified from the received acoustic signal, and subsequently the speed of sound of the fluid in the resonator is derived as already described above.

Referring again to FIG. 1, and according to an aspect of the invention, the tool can be utilized to detect the presence of gas bubbles in the borehole. In the borehole environment, gas bubbles are often emitted from a particular location of the formation, e.g., location (112). The gas bubbles flow with the borehole mud, and may enter solution with the mud. Due to the great difference in compressibility between borehole fluid with and without gas bubbles, the Helmholtz resonance frequency of samples can be significantly affected by the presence of gas bubbles in the resonator. This effect results in anomalous sound speed measurements. By correlating the anomalous measurements with the location of the tool at the time of measurement, the location of the gas influx can be determined. Note that no significant modification of the tool is required for this feature.

In the embodiments described above, the mud speed can be measured at one frequency, viz., the Helmholtz resonant frequency, for a given resonator and a mud. However, because individual resonators can be compact in size and simple in structure, in an alternative embodiment measurements at multiple frequencies of the mud may be obtained by using multiple resonators of varied resonator geometry and dimensions.

According to an aspect of the invention, the involved measurement procedures can include: the steps of sweeping the source signal in a prescribed range; detecting the received signal of the same frequency as the source frequency; and identifying the resonance frequency and Q based on the measured signal amplitude, or phase, or both, which does not tend to be particularly burdensome computationally, such that an automated circuit may be designed to track the resonance frequency and monitor the mud speed. For example, such an alternative embodiment might be particularly useful for monitoring gas influx.

Figure 8:
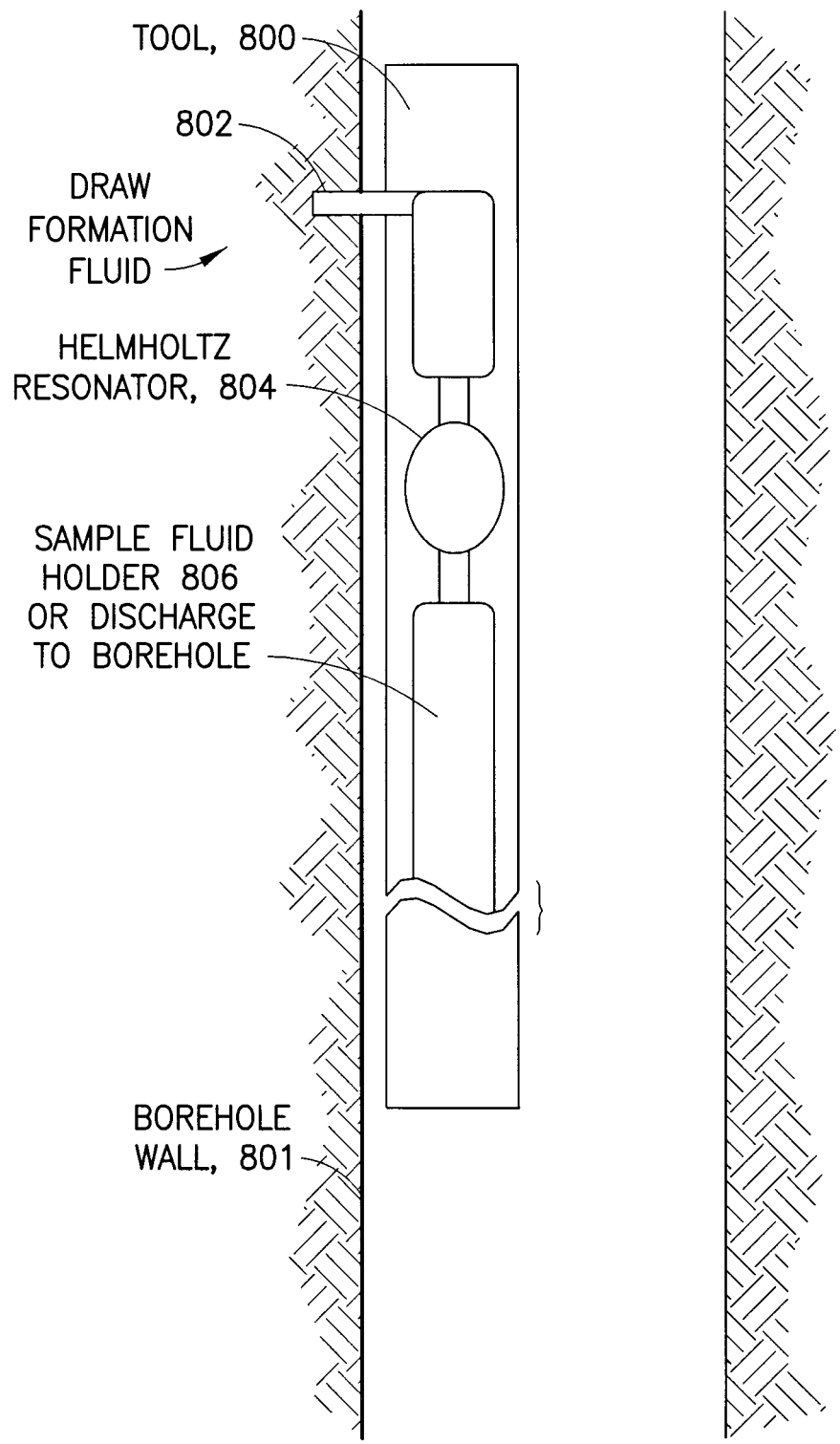
FIG. 8 illustrates an alternative embodiment in which a modified Helmholtz resonator is utilized to measure sound speed of formation fluid according to an aspect of the invention.

Referring now to FIG. 8, a modified Helmholtz resonator may be used to measure sound speed of formation fluid. In this embodiment the tool (800) includes a tube (802) which is inserted through the borehole wall (801) into the formation. Formation fluid is then drawn into the tube, e.g., in response to a pressure differential between the formation fluid and the tube. The formation fluid travels through the tube and into a modified Helmholtz resonator (804). The resonator may be equipped with valves one or both openings to provide isolation. Sound speed of the formation fluid in the resonator is obtained per the technique already described above. Subsequent measurements of formation fluid at different locations can be made by discharging the previous sample of formation fluid into a fluid holder (806), or directly into the borehole. It should be noted that the scale of the resonator (804) may be smaller than the resonators for measuring sound speed of borehole fluid and, if so, the frequency would be correspondingly higher. However, the same principles and considerations described above apply.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An apparatus for facilitating analysis of fluid within subterranean formations, the apparatus comprising:
   a tool deployable in the subterranean formation, the tool comprising:
      a Helmholtz cavity of known volume having at least a first opening and a second opening that permit flow of fluid through the Helmholtz cavity, wherein the first opening is associated with a first neck and the second opening is associated with a second neck of the Helmholtz cavity;
      an acoustic source operable to transmit an acoustic signal through the fluid in the Helmholtz cavity; and
      an acoustic receiver operable to receive the acoustic signal transmitted through the fluid in the Helmholtz cavity so as to obtain acoustic signal data.

2. The apparatus of claim 1, wherein the fluid is formation fluid.

3. The apparatus of claim 1, wherein the fluid is borehole mud.

4. The apparatus of claim 1, further comprising:
   a pump which is operable to facilitate flow of the fluid through the Helmholtz cavity.

5. The apparatus of claim 1, further comprising:
   an inflow scoop which is operable to facilitate flow of the fluid through the Helmholtz cavity.

6. The apparatus of claim 1, wherein at least one wall defining the Helmholtz cavity is rigid.

7. The apparatus of claim 1, wherein the acoustic receiver is capable of receiving transmitted acoustic signals through the fluid in the Helmholtz cavity at two or more depth locations in the subterranean formation so as to obtain acoustic signal data.

8. The apparatus of claim 1, wherein the Helmholtz cavity is structured and arranged to be positioned within the tool.

9. The apparatus of claim 1, further comprising:
a control unit operable to calculate at least one physical characteristic of the fluid using the acoustic signal data from the acoustic receiver.

10. The apparatus of claim 9, wherein the at least one physical characteristic is sound speed.

11. The apparatus of claim 9, wherein the at least one physical characteristic is fluid viscosity.

12. The apparatus of claim 9, wherein the at least one physical characteristic is presence of gas bubbles.

13. The apparatus of claim 9, wherein the control unit is disposed at a surface location.

14. The apparatus of claim 9, wherein the control unit determines a resonant frequency of the Helmholtz cavity using the acoustic signal data and calculates the at least one physical characteristic of the fluid using the resonant frequency of the Helmholtz cavity.

15. The apparatus of claim 14, wherein the control unit calculates the at least one physical characteristic of the fluid using the resonant frequency of the Helmholtz cavity and the known volume of the Helmholtz cavity.

16. A method for facilitating analysis of fluid within subterranean formations, the method comprising:
deploying a tool in the subterranean formation, wherein the tool includes an acoustic source, an acoustic receiver, and a Helmholtz cavity of known volume having at least a first opening and a second opening that permit flow of fluid through the Helmholtz cavity, wherein the first opening is associated with a first neck and the second opening is associated with a second neck of the Helmholtz cavity;
causing fluid to flow through the Helmholtz cavity;
transmitting an acoustic signal through the fluid in the Helmholtz cavity using the acoustic source;
receiving the acoustic signal transmitted through the fluid in the Helmholtz cavity using the acoustic receiver so as to obtain acoustic signal data; and
calculating at least one physical characteristic of the fluid using the acoustic signal data from the acoustic receiver.

17. The method of claim 16, wherein the at least one physical characteristic is sound speed.

18. The method of claim 16, wherein the at least one physical characteristic is fluid viscosity.

19. The method of claim 16, wherein the at least one physical characteristic is presence of gas bubbles.

20. The method of claim 16, wherein the fluid is formation fluid.

21. The method of claim 16, wherein the fluid is borehole mud.

22. The method of claim 16, further comprising:
pumping fluid through the Helmholtz cavity.

23. The method of claim 16, further comprising:
using an inflow scoop to facilitate flow of the fluid through the Helmholtz cavity.

24. The method of claim 16, wherein calculating at least one physical characteristic of the fluid includes:
determining a resonant frequency of the Helmholtz cavity using the acoustic signal data; and
calculating the at least one physical characteristic of the fluid using the resonant frequency of the Helmholtz cavity.

25. An apparatus for facilitating analysis of borehole fluid within subterranean formations, the apparatus comprising:
a tool deployable in the subterranean formation, the tool comprising:
a Helmholtz cavity of known volume having at least a first opening and a second opening that permit flow of borehole fluid through the Helmholtz cavity, wherein the first opening is associated with a first neck and the second opening is associated with a second neck of the Helmholtz cavity;
an acoustic source operable to transmit an acoustic signal through the borehole fluid in the Helmholtz cavity;
an acoustic receiver operable to receive the acoustic signal transmitted through the borehole fluid in the Helmholtz cavity so as to obtain acoustic signal data; and
at least one control unit operable to calculate at least one physical characteristic of the borehole fluid using the acoustic signal data from the acoustic receiver, wherein the at least one control unit calculates the at least one physical characteristic of the borehole fluid using a resonant frequency of the Helmholtz cavity.

26. The apparatus of claim 25, wherein the borehole fluid is borehole mud.

27. The apparatus of claim 25, wherein the borehole fluid is formation fluid.

28. The apparatus of claim 25, wherein the at least one wall defining the Helmholtz cavity of known volume is rigid.

29. The apparatus of claim 25, wherein the at least one physical characteristic is sound speed.

* * * * *